(12) United States Patent
Abrishami et al.

(10) Patent No.: US 8,265,255 B1
(45) Date of Patent: Sep. 11, 2012

(54) END-TO-END SESSION WITHOUT SIGNALING PROTOCOL

(75) Inventors: Mehrdad Abrishami, Gaithersburg, MD (US); Jianwei Bei, Rockville, MD (US); Ganesh Pasupathy, Rockville, MD (US); Ran Katzur, North Patomac, MD (US)

(73) Assignee: Marvell International Ltd., Hamilton (BM)

( * ) Notice: Subject to any disclaimer, the term of this patent is extended or adjusted under 35 U.S.C. 154(b) by 1700 days.

(21) Appl. No.: 11/247,941

(22) Filed: Oct. 10, 2005

Related U.S. Application Data

(60) Provisional application No. 60/669,458, filed on Apr. 7, 2005.

(51) Int. Cl.
*H04M 7/00* (2006.01)

(52) U.S. Cl. .............. 379/220.01; 379/88.14; 379/93.15; 379/142.14; 379/219; 370/352; 370/397; 455/414.4

(58) Field of Classification Search .................. 709/204; 370/352, 354, 397, 399; 379/88.14, 93.08, 379/93.15, 100.13, 142.14, 219, 221.15, 379/220.01; 455/414.4
See application file for complete search history.

(56) References Cited

U.S. PATENT DOCUMENTS

| | | | |
|---|---|---|---|
| 6,597,689 B1 * | 7/2003 | Chiu et al. ................... | 370/354 |
| 2002/0065067 A1 * | 5/2002 | Khare et al. ................. | 455/414 |
| 2002/0078151 A1 * | 6/2002 | Wickam et al. ............... | 709/204 |
| 2004/0023679 A1 * | 2/2004 | Shoobridge ................... | 455/522 |

* cited by examiner

*Primary Examiner* — Khai N Nguyen

(57) ABSTRACT

An endpoint system for media communication comprises a resource-limited device and a base station. The resource-limited device at least one of receives and outputs at least one of audio and graphic information. The base station communicates media and control packets with the resource-limited device via a permanent virtual circuit, establishes a switched virtual circuit with an endpoint device via a communications channel, and translates media packets between the permanent virtual circuit and the switched virtual circuit.

36 Claims, 7 Drawing Sheets

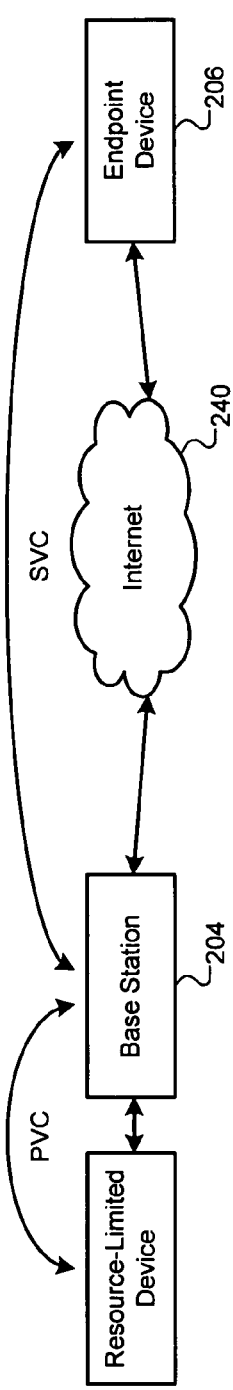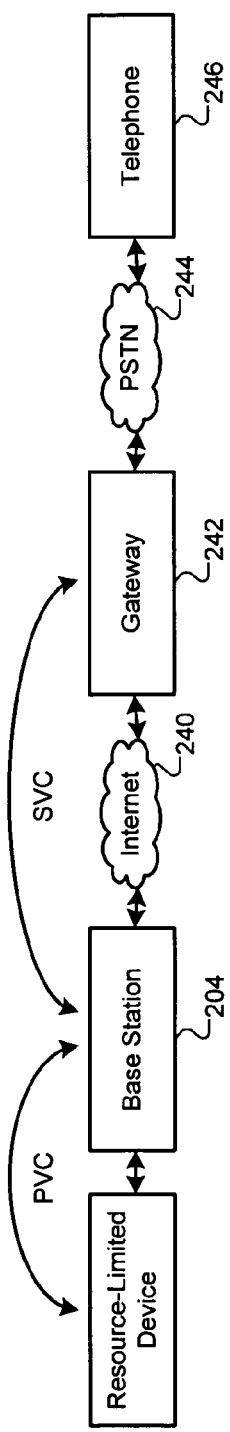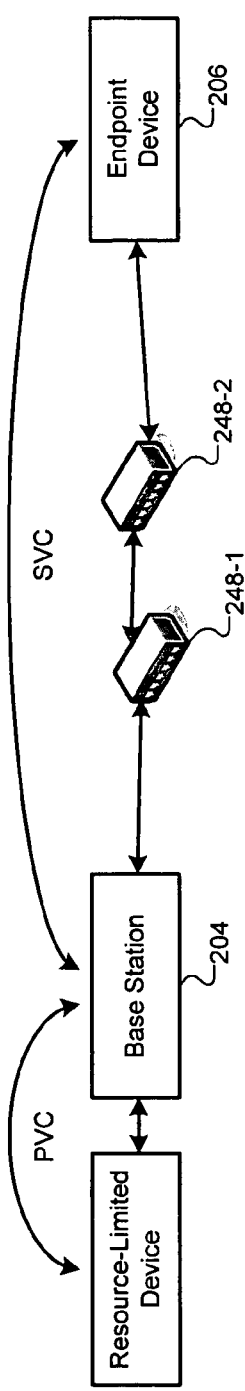

END-TO-END SESSION WITHOUT SIGNALING PROTOCOL

CROSS-REFERENCE TO RELATED APPLICATIONS

This application claims the benefit of U.S. Provisional Application No. 60/669,458, filed on Apr. 7, 2005, which is incorporated herein by reference in its entirety.

FIELD OF THE INVENTION

The present invention relates to resource-limited media devices.

BACKGROUND OF THE INVENTION

Referring now to FIG. 1, a first endpoint device 102 communicates via a communications channel 104 with a second endpoint device 106. The first and second endpoint devices 102 and 106 may be telephones, computers, or other Voice over IP (VoIP) capable devices. The communications channel 104 may be a local area network, the Internet, or any other suitable distributed communications medium. Typically, first and second endpoint devices 102 and 106 establish a connection using a signaling protocol such as Session Initiation Protocol (SIP). The signaling protocol determines common capabilities of the endpoint devices 102 and 106. The established connection may use the Real time Transport Protocol (RTP) to transmit data, and this connection may be referred to as a Switched Virtual Circuit (SVC).

Alternately, the first endpoint device 102 may communicate with the communications channel 104 via a base station 108, as shown in FIG. 2. In this case the first endpoint device 102 may be a cordless phone communicating with the hardwired base station 108. In either case, the first and second endpoint devices 102 and 106 implement the signaling functionality. The endpoint devices 102 and 106 also implement media processing functionality.

SUMMARY OF THE INVENTION

An endpoint system for media communication comprises a resource-limited device and a base station. The resource-limited device at least one of receives and outputs at least one of audio and graphic information. The base station communicates media and control packets with the resource-limited device via a permanent virtual circuit, establishes a switched virtual circuit with an endpoint device via a communications channel, and translates media packets between the permanent virtual circuit and the switched virtual circuit.

In other features, the base station comprises a transceiver that communicates with the resource-limited device; a communications module adapted to connect to the communications channel; a media converter that converts media packets from the communications module into a first media format and converts media packets from the transceiver into a second media format; a connection handler adapted to set up and tear down a switched virtual circuit over the communications channel via the communications module; and a control module that coordinates operation of the media converter and the transceiver, and that selectively directs the connection handler to set up and tear down switched virtual circuits.

In still other features, a plurality of resource-limited devices includes the resource-limited device, and the plurality of resource-limited devices communicates with the base station. The resource-limited device is limited in comparison with the base station in at least one of processing ability, memory, and power consumption. The resource-limited device comprises at least one of a microphone, a handset, a speaker, and a headset. The resource-limited device is capable of operating in a standby mode, whereby the resource-limited device powers components necessary to monitor for a resume signal from the base station.

In further features, the resource-limited device exchanges media information with the base station using a predetermined packet format. The resource-limited device exchanges control information with the base station using packets in the predetermined packet format, wherein a control payload type of the packets indicates when the packets contain control information. The permanent virtual circuit includes a predetermined UDP port.

In other features, a second resource-limited device communicates with the base station via a second permanent virtual circuit. The base station establishes the switched virtual circuit using Session Initiation Protocol. The base station establishes the switched virtual circuit using Media Gateway Control Protocol. The base station establishes the switched virtual circuit using ITU-T H.323. the switched virtual circuit includes a negotiated UDP port. The switched virtual circuit provides a conduit for a Real-time Transport protocol stream.

In still other features, the base station is included in at least one of a cordless telephone base station, a telephone cradle, and a computer. The base station translates media information received from the communications channel into a predetermined media format. The base station translates media information received from the resource-limited device in the predetermined media format into a second media format for transmission through the communications channel. The media information comprises audio information, and the second media format is ITU-T G.729.

In further features, the media information comprises audio information, and the predetermined media format is pulse-code modulation. The media information comprises audio information, and the predetermined media format is ITU-T G.711. The base station performs de-jitter buffer management. The base station performs packet loss concealment. The base station negotiates with the resource-limited device to determine capabilities of the resource-limited device.

A communications system comprises the endpoint system; a communications channel; and an endpoint device that communicates with the endpoint system via the communications channel. The communications channel comprises at least one of a local area network, a wide area network, and an Internet connection. The endpoint device is capable of supporting Voice over Internet Protocol calls. The endpoint device comprises at least one of a telephone, a computer, and a PSTN gateway. The endpoint system is capable of establishing a Voice over Internet Protocol call with the endpoint device.

A method for media communication comprises communicating media and control information with a resource-limited device via a permanent virtual circuit; interfacing the resource-limited device with a surrounding environment, where the interfacing includes at least one of capturing and outputting at least one of audio and graphic information; establishing a switched virtual circuit with an endpoint device via a communications channel; and translating media packets between the permanent virtual circuit and the switched virtual circuit.

In other features, media packets are converted from the communications channel into a first media format and media packets are converted from the resource-limited device into a second media format. The resource-limited device is operated in a standby mode, where the resource-limited device powers components necessary to monitor for a resume signal. The communicating includes using a predetermined packet format.

In still other features, communicating includes marking packets with a control payload type of the packets to indicate when the packets contain control information. The establishing includes using Session Initiation Protocol. The establishing includes using Media Gateway Control Protocol. The establishing includes using ITU-T H.323. The translating includes converting media information received from the communications channel into a predetermined media format. The translating includes converting media information received from the resource-limited device into a second media format. The media information comprises audio information, and the second media format is ITU-T G.729.

In further features, the media information comprises audio information, and the predetermined media format is pulse-code modulation. The media information comprises audio information, and the predetermined media format is ITU-T G.711. De-jitter buffer management is performed. Packet loss concealment is performed. Capabilities are negotiated with the resource-limited device.

A base station for media communication comprises a transceiver that communicates media and control packets with a resource-limited device via a permanent virtual circuit; a communications module adapted to establish a switched virtual circuit with an endpoint device over a communications channel; a media converter that converts media packets from the communications module into a first media format and converts media packets from the transceiver into a second media format; a connection handler adapted to set up and tear down a switched virtual circuit over the communications channel via the communications module; and a control module that coordinates operation of the media converter and the transceiver, and that selectively directs the connection handler to set up and tear down switched virtual circuits.

In other features, the transceiver communicates with a plurality of resource-limited devices including the resource-limited device. The transceiver selectively generates a resume signal to direct the resource-limited device to wake from a standby mode. The transceiver communicates with the resource-limited device using a predetermined packet format. The control packets are of the predetermined format, and a payload type indicates presence of control information. The permanent virtual circuit includes a predetermined UDP port. The connection handler establishes the switched virtual circuit using Session Initiation Protocol. The connection handler establishes the switched virtual circuit using Media Gateway Control Protocol. The connection handler establishes the switched virtual circuit using ITU-T H.323. The switched virtual circuit includes a negotiated UDP port. The switched virtual circuit provides a conduit for a Real-time Transport Protocol stream.

A system includes the base station, wherein the system is at least one of a cordless telephone base station, a telephone cradle, and a computer. The first media format is used for transmitting media information to the resource-limited device. The second media format is used for transmitting media information through the communications channel. The first media format is pulse-code modulation. The first media format is ITU-T G.711. The second media format is ITU-T G.729. The communications module performs de-jitter buffer management. The communications module performs packet loss concealment. The control module is capable of negotiating with the resource-limited device to determine capabilities of the resource-limited device.

A method for media communication comprises communicating media and control packets with a resource-limited device via a permanent virtual circuit; establishing a switched virtual circuit with an endpoint device over a communications channel; converting media packets from the communications module into a first media format and converting media packets from the transceiver into a second media format; exchanging media packets over the switched virtual circuit; and coordinating operation of the converting and the communicating.

In other features, a resume signal is selectively generated to direct the resource-limited device to wake from a standby mode. The communicating includes using a predetermined packet format. The communicating includes marking control packets with a control payload type to indicate presence of control information. The establishing includes using Session Initiation Protocol. The establishing includes using Media Gateway Control Protocol. The establishing includes using ITU-T H.323. The exchanging includes using a Real-time Transport Protocol stream. The communicating uses the first media format. The exchanging uses the second media format.

In further features, the first media format is pulse-code modulation. The first media format is ITU-T G.711. The second media format is ITU-T G.729. De-jitter buffer management is performed. Packet loss concealment is performed. Capabilities are negotiated with the resource-limited device.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4A is a functional block diagram of an exemplary implementation of a communications system with a first communications channel according to the principles of the present invention;

FIG. 4B is a functional block diagram of an exemplary implementation of a communications system with a second communications channel according to the principles of the present invention;

FIG. 4C is a functional block diagram of an exemplary implementation of a communications system with a third communications channel according to the principles of the present invention;

DETAILED DESCRIPTION OF THE PREFERRED EMBODIMENTS

Figure 1:
FIG. 1 is a functional block diagram of a communications system according to the prior art.
Figure 2:
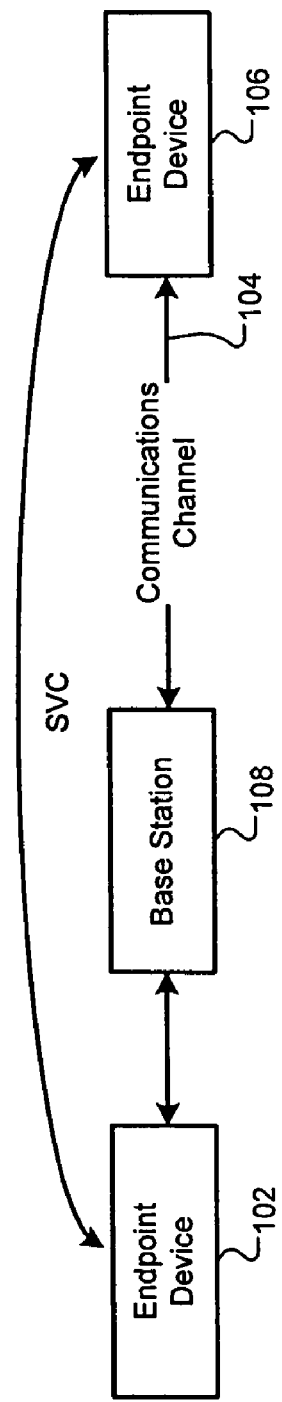
FIG. 2 is a functional block diagram of an alternative communications system according to the prior art.

The following description of the preferred embodiments is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
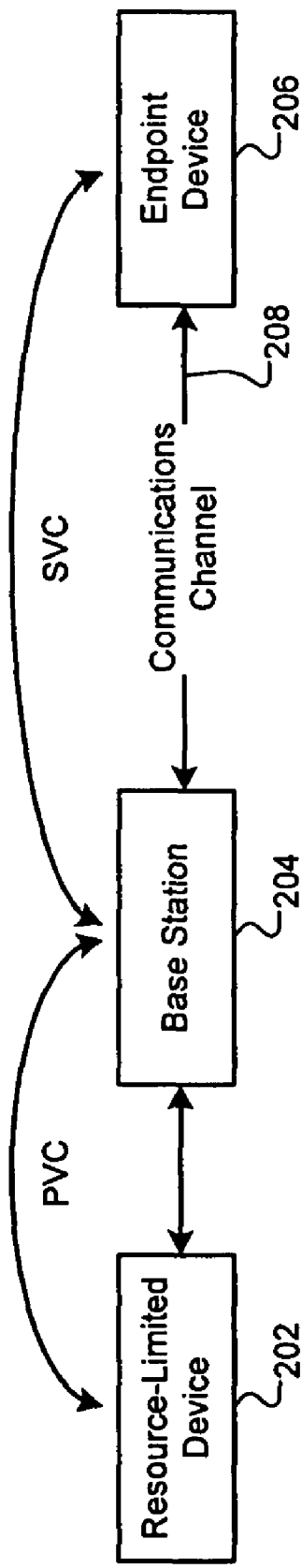
FIG. 3 is a functional block diagram of an exemplary implementation of a communications system according to the principles of the present invention.

Referring now to FIG. 3, a functional block diagram of an exemplary implementation of a communications system according to the principles of the present invention is depicted. A resource-limited device (RLD) 202 communicates with a base station 204. The base station 204 communicates with an endpoint device 206 via a communications channel 208. The communications channel 208 may be a local area network, a wide area network, the Internet, or any other suitable medium. The endpoint device 206 may be a Voice over IP (VoIP) enabled telephone, a computer, a Public Switched Telephone Network (PSTN) gateway, or any other suitable device. The endpoint device 206 may be a physical device that a user employs to place and conduct a VoIP telephone call; alternately, the endpoint device 206 may relay the telephone call to another capable device, as is the case with a PSTN gateway.

Referring now to FIG. 4A, a functional block diagram of an exemplary implementation of a communication system using the Internet is depicted. The base station 204 communicates with the endpoint device 206 via an Internet connection 240. The base station 204 and the endpoint device 206 may communicate via User Datagram Protocol (UDP) datagrams transmitted through the Internet 240. The Internet link 240 may be governed by various Quality of Service requirements to allow the UDP datagrams to arrive in a timely fashion.

Another communications channel embodiment is depicted as a functional block diagram in FIG. 4B. The base station 204 communicates with a gateway 242 via the Internet 240. The gateway 242 converts from the connection created with the base station 204 into a standard telephone call over the Public Switched Telephone Network (PSTN) 244. This PSTN call may then be connected with a standard telephone 246. A further communications channel embodiment is depicted as a functional block diagram in FIG. 4C. The base station 204 communicates with the endpoint device 206 via a local area network depicted by two routers 248-1 and 248-2.

Referring back to FIG. 3, the resource limited device (RLD) 202 may be a microphone, a handset, a speaker, a headset, or any other device that may be limited as to processing power, memory, battery, and/or some other resource. The base station may be included in a cordless telephone base station, a telephone cradle, a computer, or any other suitable device. The base station 204 and RLD 202 may even be included in a single physical device.

The RLD 202 communicates with the base station 204 via a Permanent Virtual Circuit (PVC). The PVC may include a predetermined UDP (User Datagram Protocol) port. The PVC can be created by any suitable connection arrangement, though preferably one that is fixed or predetermined so as to require no connection negotiation or additional processing on the part of the RLD 202. The base station 204 establishes an end-to-end connection with the endpoint device 206, possibly at the request of the RLD 202. This Switched Virtual Circuit (SVC) may use a negotiated UDP port to carry a Real time Transport Protocol (RTP) media stream.

The SVC connection may be point to point, or may be part of a multicast connection. The connection can be established by any suitable protocol, including the Session Initiation Protocol (SIP), the Media Gateway Control Protocol (MGCP), and ITU-T Recommendation H.323 (a standard for packet-based multimedia communications systems). The signaling protocol also determines common capabilities of the base station 204 and endpoint device 206.

The base station 204 then translates between the Switched Virtual Circuit (SVC) and the Permanent Virtual Circuit (PVC). In this way the RLD 202 does not need to be capable of independently setting up, or even being aware of, the communication between the base station 204 and the endpoint device 206. The RLD 202 can then be independent of the communications channel 208 and the signaling protocol used between the base station 204 and the endpoint device 206.

Media information is often encoded when transmitted through the communications channel 208. This encoding may help to reduce latency, uncorrectable errors, and/or required bandwidth. The base station 204 may translate this media information, which may include audio or visual information. For an example case of audio, the base station 204 may translate media encoded in the MP3 format to a predetermined simple type such as Pulse Code Modulation (PCM). When PCM data is communicated to the RLD 202, very little processing remains—the RLD 202 may only need to buffer the PCM data and supply it to a digital-to-analog converter.

As a further example, the base station 204 may translate from G.729 encoding (ITU-T Recommendation G.729—voice compression that works in 10 ms blocks) to G.711 encoding (ITU-T Recommendation G.711—compressed PCM). The base station 204 may also work in the other direction—encoding media information from the RLD 202 for transmission across the communications channel 208.

The RLD 202 may exchange commands with the base station 204 via packets within the data stream marked with a special payload type. With control and data mixed, the RLD 202 need only be capable of supplying a single packet type to the base station 204. The packet payload type specifies whether the data constitutes media or control information. In other features, the RLD 202 may be able to operate in a standby mode in which the RLD 202 consumes only enough power to receive signals from the base station 204. In this way the base station 204 can instruct the RLD 202 to resume full power operation, such as when a call comes in or when other communication with the user is desired.

Figure 5:
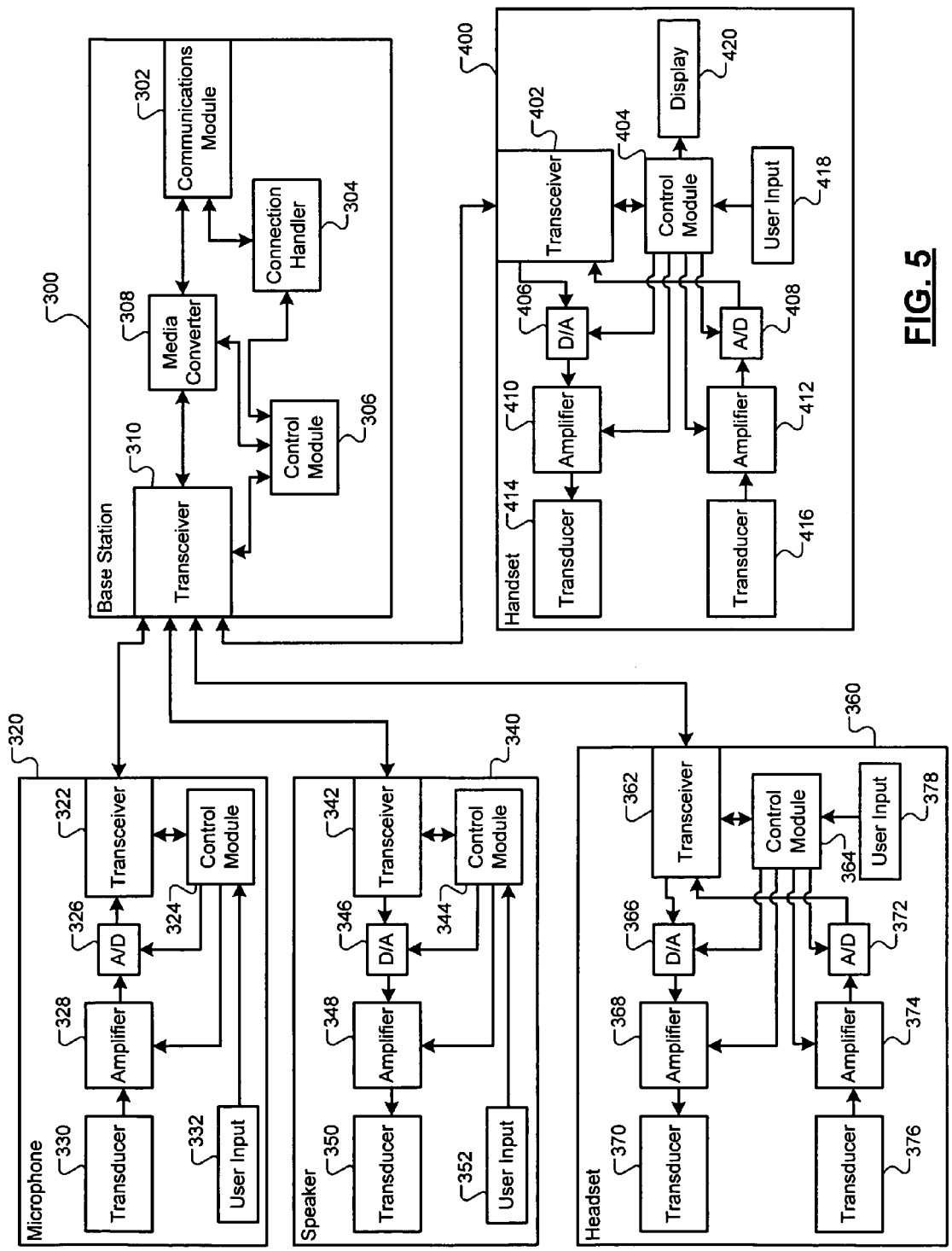
FIG. 5 is a detailed functional block diagram of exemplary implementations of a base station and resource-limited devices.

Referring now to FIG. 5, a functional block diagram depicts exemplary implementations of a base station and resource limited devices. An exemplary base station 300 contains a communications module 302 that can establish a network connection with the communications channel 208. The communications module 302 communicates with a connection handler 304 that facilitates connection maintenance and takedown of a switched virtual circuit. The connection handler 304 communicates with a control module 306, which also controls a media converter 308 and a transceiver 310.

The media converter 308 communicates with the communications module 302 and with the transceiver 310. The transceiver 310 communicates with resource limited devices through a wired and/or wireless medium. The media converter 308 selectively converts media packets received from the communications module 302 into simple media types to be transmitted via the transceiver 310 to the resource limited devices. The media converter 308 also converts in the other direction—from simple data types to data types for transmission by the communications module 302. The control module 306 directs the connection handler 304 to set up or tear down switched virtual circuits. The control module 306 also tracks which resource-limited devices are connected to the transceiver 310. Based on this information, the control module 306 can direct the transceiver 310 to transmit one type of media information to one RLD, receive another type of media information from another RLD, and both send and receive a third type of media information with a third RLD. The control module 306 actuates the media converter 308 to handle these various types of media information.

An exemplary microphone device 320 includes a transceiver 322, which communicates with the base station 300. A control module 324 controls the transceiver 322, and also communicates with an ADC (analog-to-digital converter) 326, an amplifier 328, a transducer 330, and a user input device 332. The transducer 330 converts sound waves into electrical energy, which is then amplified by the amplifier 328 and converted to the digital domain by the ADC 326. This digital data is selectively transmitted to the base station 300 by the transceiver 322, which may include a buffer for data to be transmitted. The user input device 332 may include a microphone mute switch. In some embodiments, the transceiver 322 may instead be a unidirectional transmitter.

An exemplary speaker device 340 contains a transceiver 342 which communicates with the base station 300. The transceiver 342 is controlled by a control module 344, which also communicates with a DAC (digital-to-analog converter) 346, an amplifier 348, a transducer 350, and a user input device 352. The transceiver 342 buffers incoming media packets, transfers them to the DAC 346, which converts the media packets into an analog waveform. The analog waveform is amplified by the amplifier 348 and reproduced as sound by the transducer 350. In an alternative embodiment, the DAC 346 and amplifier 348 are combined into a single digital switching amplifier. The user input device 352 may include a mute switch to silence output of the transducer 350 and a volume control for the amplifier 348. In some embodiments, the transceiver 322 may instead be a unidirectional receiver.

An exemplary headset 360 includes a transceiver 362 which communicates with the base station 300. The transceiver 362 is controlled by a control module 364, which also communicates with a DAC 366, a first amplifier 368, a first transducer 370, an ADC 372, a second amplifier 374, a second transducer 376, and a user input device 378. The transceiver 362 receives media packets and transfers them to the DAC 366, whose output is amplified by the amplifier 368, and reproduced as sound by the first transducer 370. The second transducer 376 converts sound waves into electrical data, which is amplified by the second amplifier 374, converted to digital by the ADC 372, and selectively transferred to the base station by the transceiver 362. The user input device 378 may include a microphone mute switch, a speaker silent switch, and a call answer button.

An exemplary handset 400 includes a transceiver 402, which communicates with the base station 300. The transceiver 402 is controlled by a control module 404, which also communicates with a DAC 406, an ADC 408, first and second amplifiers 410 and 412, first and second transducers 414 and 416, a user input device 418, and a display 420. Operation of the components 402, 406, 408, 410, 412, 414, and 416 are similar to corresponding elements of the headset 360. The user input device 418 provides user input to the control module, which selectively directs the transceiver 402 to send control signals to the base station 300.

The user input device 418 may include an alphanumeric keypad for entering input such as a phone number, name, and/or text message. The user input device 418 may also include other call management features such as caller ID review, redial and/or call waiting switching. In addition, the user input device 418 may support text messaging and/or TDD (Telecommunications Device for the Deaf) input. The optional display 420 displays information including dialing information, text information, graphics, video, and/or web content. Alternately, a touchscreen may combine features of the user input device 418 and display 420.

Operation of standby mode in the handset 400 will be described. This discussion is applicable to other resource-limited devices, including the microphone device 320, speaker device 340, and headset 360. The handset 400 may be placed in standby mode by direction of the base station 300, user instruction via the user input device 418, and/or direction by the control module 404, such as after a predetermined time delay. In standby mode, power to all devices within the handset 400 except for the transceiver 402 can be turned off. The transceiver waits for a specified signal to be received from the base station 300, and upon receiving it, causes the control module 404 to power on. The control module 404 can then cause power to resume to other components. The specified signal may simply be a certain frequency signal above a certain voltage threshold, or a predetermined digital sequence.

Figure 6:
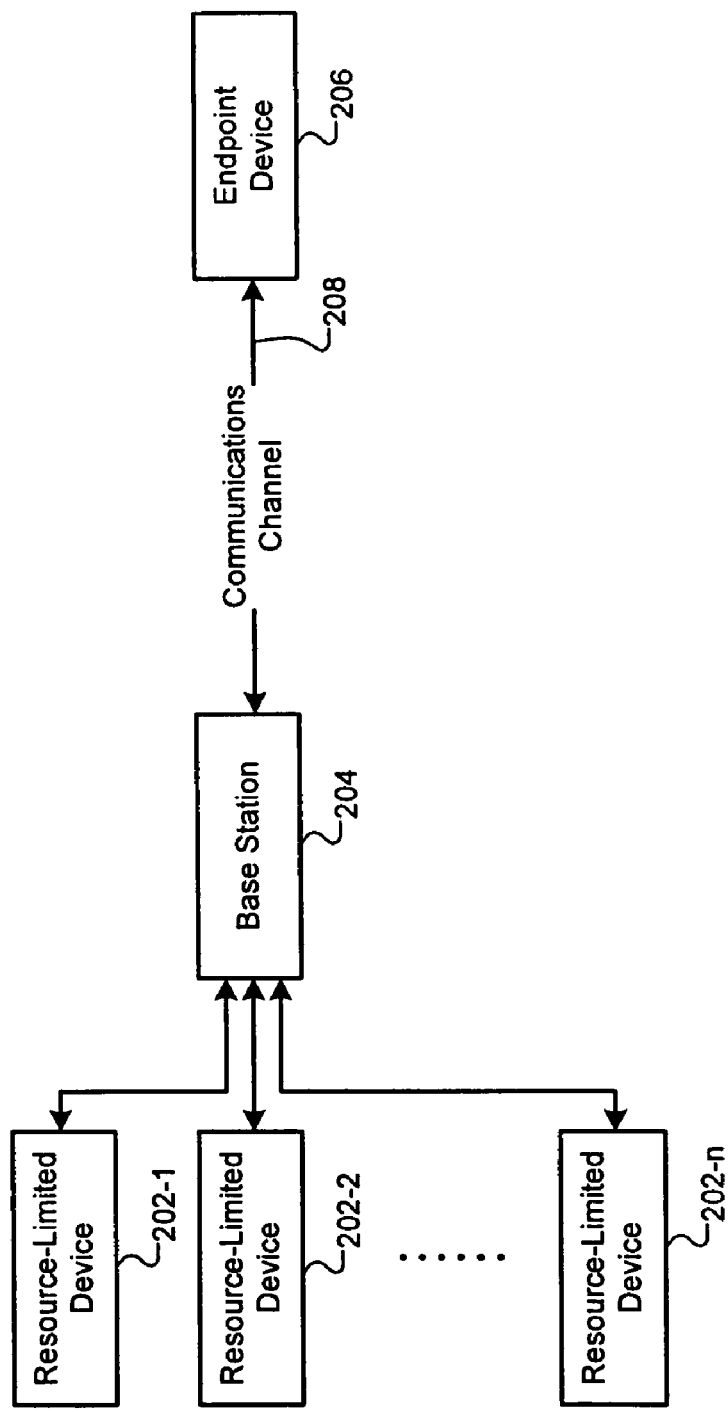
FIG. 6 is a functional block diagram of an exemplary implementation of a multi-device communications system according to the principles of the present invention.

Referring now to FIG. 6, a functional block diagram of an exemplary implementation of a multi-device communications system according to the principles of the present invention is presented. In this case the base station 204 communicates with n RLDs 202-1, 202-2, . . . , 202-n. The RLDs 202 each communicate with the base station 204 via a predetermined Permanent Virtual Circuit (PVC). The RLDs 202 are isolated from changes to the communications channel 208 and from signaling protocol variations relevant to the base station 204 and the endpoint device 206. New applications and software updates need only be downloaded to a single device, the base station 204. Forward/backward compatibility can be achieved by implementing a simple capability negotiation phase between the base station 204 and the RLDs 202. The base station 204 can be updated with extended features, and may negotiate with the RLDs 202 to see which feature subsets are implemented in each RLD 202.

The RLDs 202 are thus free from the memory, processing, and attendant power requirements associated with media coding, signaling protocol overhead, and other possible processes, such as de-jitter buffer management and packet loss concealment. In addition to simply shifting resources from RLDs to a different device—the base station 204—many of these resources can be combined. For example, the base station 204 likely requires only one protocol stack and storage for only one set of signaling and codec instructions. As a result, a system including the base station 204 and RLDs 202 requires less aggregate power and is less expensive than when processing was distributed. Further, the RLDs 202 themselves are markedly lower in power and cost, allowing one to implement a headset, microphone, speaker, or other device very cost-effectively.

Figure 7B:
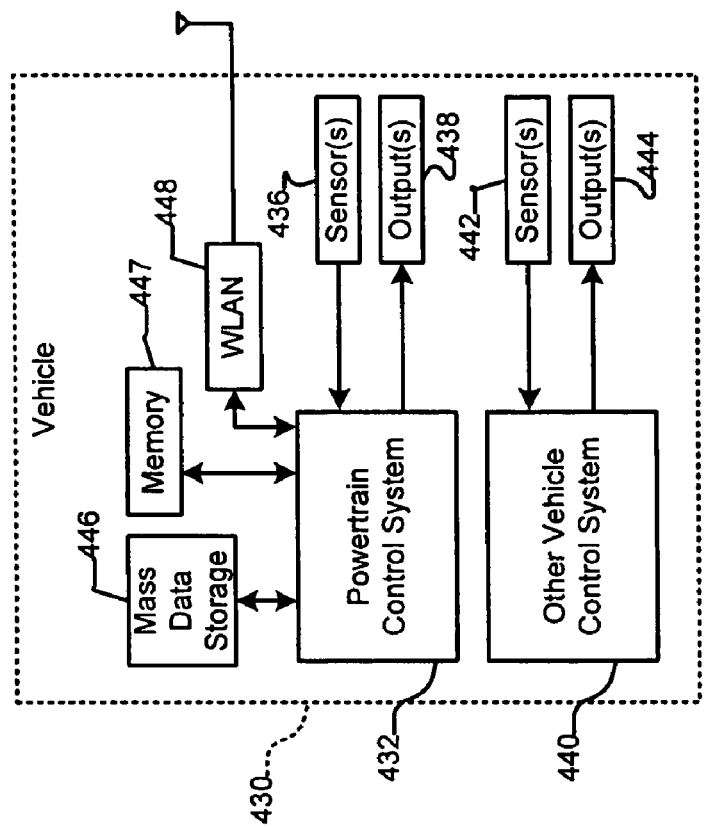
FIG. 7B is a functional block diagram of a vehicle control system.
Figure 7A:
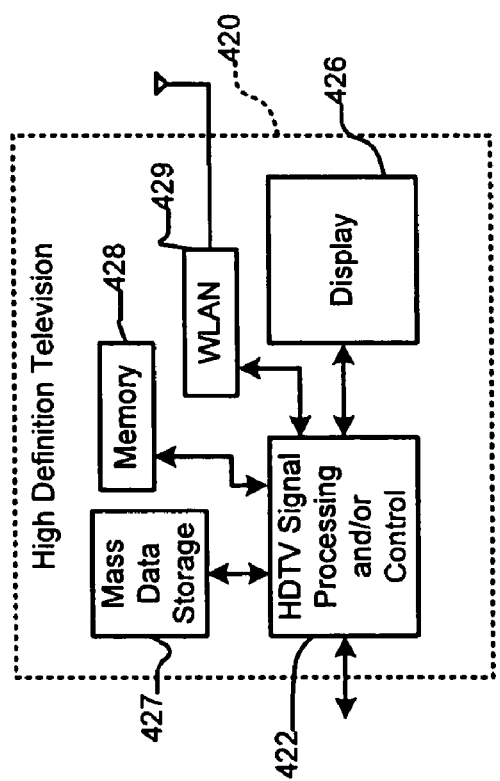
FIG. 7A is a functional block diagram of a high definition television.

Referring now to FIGS. 7A-7D, various exemplary implementations of the present invention are shown. Referring now to FIG. 7A, at least the base station of the present invention can be implemented in a high definition television (HDTV) 420. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The Hard Disk Drive (HDD) may be a mini HDD that includes one or more platters having a diameter that is smaller than approximately 1.8". The HDTV 420 may be connected to memory 428 such as RAM, ROM, low latency nonvolatile memory such as flash memory, and/or other suitable electronic data storage. The HDTV 420 also may support connections with a WLAN via a WLAN network interface 429. The base station may be implemented in control circuitry 422 and use WLAN network interface 429 to communicate with RLDs.

Referring now to FIG. 7B, at least the base station of the present invention may be implemented in a control system of a vehicle 430 and/or a WLAN interface. In some implementations, a powertrain control system 432 receives inputs from one or more sensors such as temperature sensors, pressure sensors, rotational sensors, airflow sensors, and/or any other suitable sensors and/or generates one or more output control signals such as engine operating parameters, transmission operating parameters, and/or other control signals.

The present invention may also be implemented in other control systems 440 of the vehicle 430. The control system 440 may likewise receive signals from input sensors 442 and/or output control signals to one or more output devices 444. In some implementations, the control system 440 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 432 may communicate with mass data storage 446 that stores data in a nonvolatile manner. The mass data storage 446 may include optical and/or magnetic storage devices for example hard disk drives HDD and/or DVDs. The HDD may be a mini HDD that includes one or more platters having a diameter that is smaller than approximately 1.8". The powertrain control system 432 may be connected to memory 447 such as RAM, ROM, low latency nonvolatile memory such as flash memory, and/or other suitable electronic data storage. The powertrain control system 432 also may support connections with a WLAN via a WLAN network interface 448. The control system 440 may also include mass data storage, memory and/or a WLAN interface (all not shown). The base station may be implemented in powertrain control system 432 and use WLAN network interface 448 to communicate with RLDs.

Figure 7C:
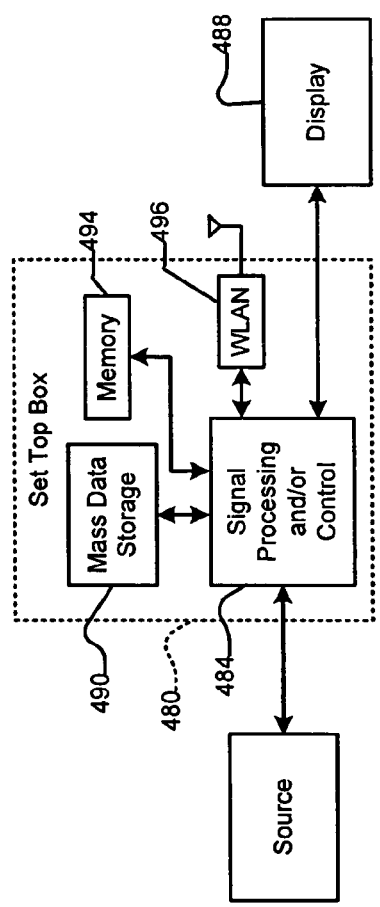
FIG. 7C is a functional block diagram of a set top box.

Referring now to FIG. 7C, the present invention can be implemented in a set top box 480. The present invention may be implemented in either or both signal processing and/or control circuits, which are generally identified in FIG. 7C at 484 and/or a WLAN interface. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496. The base station may be implemented in control logic 484 and use WLAN network interface 496 to communicate with RLDs.

Figure 7D:
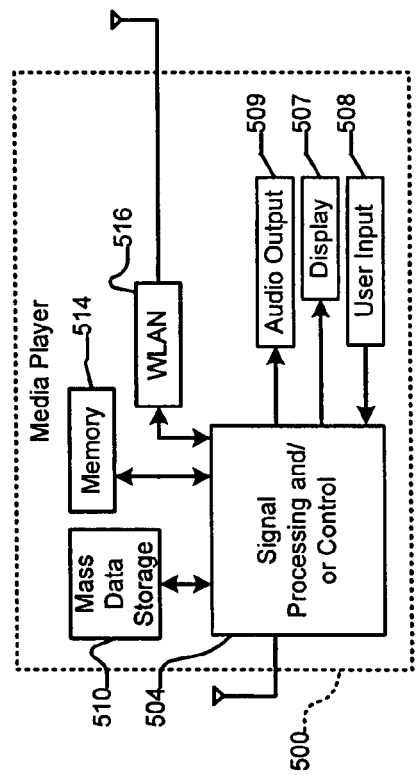
FIG. 7D is a functional block diagram of a media player.

Referring now to FIG. 7D, the present invention can be implemented in a media player 500. The present invention may be implemented in either or both signal processing and/or control circuits, which are generally identified in FIG. 7D at 504 and/or a WLAN interface. In some implementations, the media player 500 includes a display 507 and/or a user input 508 such as a keypad, touchpad, or the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated. The base station may be implemented in control logic 504 and use WLAN network interface 516 to communicate with RLDs.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An endpoint system for media communication, the endpoint system comprising:
   a resource-limited device configured to at least one of receive and output at least one of audio information and graphic information; and
   a base station configured to
      negotiate with the resource-limited device to determine a feature subset of the resource-limited device,
      communicate media and control packets with the resource-limited device via a permanent virtual circuit, wherein media packets transmitted from the base station to the resource-limited device are selected based on the feature subset of the resource-limited device,
    establish a switched virtual circuit with an endpoint device via a communications channel, and
    translate media packets between the permanent virtual circuit and the switched virtual circuit,
  wherein the base station is included in one of a cordless telephone base station or a telephone cradle,
  wherein the base station comprises a media converter configured to (i) convert media packets from the communications channel into a first digital audio compression format and (ii) convert media packets from the resource-limited device into a second digital audio compression format,
  wherein the resource-limited device is configured to selectively operate in a standby mode, and in the standby mode, the resource-limited device is configured to power components necessary to monitor for a resume signal from the base station, and
  wherein the permanent virtual circuit includes one of a predetermined user datagram protocol (UDP) port or a negotiated UDP port.

2. The endpoint system of claim 1, wherein the base station further comprises:
   a transceiver configured to communicate with the resource-limited device;
   a communications module configured to connect to the communications channel;
   a connection handler configured to set up and tear down the switched virtual circuit over the communications channel via the communications module; and
   a control module configured to (i) coordinate operation of the media converter and the transceiver, and (ii) selectively direct the connection handler to set up and tear down switched virtual circuits.

3. The endpoint system of claim 1, further comprising a plurality of resource-limited devices including the resource-limited device, wherein the plurality of resource-limited devices are configured to communicate with the base station.

4. The endpoint system of claim 1, wherein the resource-limited device is limited in comparison with the base station in at least one of processing ability, memory, and power consumption.

5. The endpoint system of claim 1, wherein the resource-limited device comprises at least one of a microphone, a handset, a speaker, and a headset.

6. The endpoint system of claim 1, wherein the resource-limited device is configured to exchange media information with the base station using a predetermined packet format.

7. The endpoint system of claim 6, wherein the resource-limited device is configured to exchange control information with the base station using packets in the predetermined packet format, wherein a control payload type of the packets indicates when the packets contain control information.

8. The endpoint system of claim 1, further comprising a second resource-limited device configured to communicate with the base station via a second permanent virtual circuit.

9. The endpoint system of claim 1, wherein the base station is configured to establish the switched virtual circuit using Session Initiation Protocol.

10. The endpoint system of claim 1, wherein the base station is configured to establish the switched virtual circuit using Media Gateway Control Protocol.

11. The endpoint system of claim 1, wherein the base station is configured to establish the switched virtual circuit using International Telecommunication Union Telecommunication Standardization Sector (ITU-T) Recommendation H.323.

12. The endpoint system of claim 1, wherein the switched virtual circuit provides a conduit for a Real-time Transport protocol stream.

13. The endpoint system of claim 1, wherein the first digital audio compression format is a predetermined format.

14. The endpoint system of claim 13, wherein the second digital audio compression format is International Telecommunication Union Telecommunication Standardization Sector (ITU-T) Recommendation G.729.

15. The endpoint system of claim 13, wherein the predetermined format is pulse-code modulation.

16. The endpoint system of claim 13, wherein the predetermined format is International Telecommunication Union Telecommunication Standardization Sector (ITU-T) Recommendation G.711.

17. The endpoint system of claim 1, wherein the base station is configured to perform de-jitter buffer management.

18. The endpoint system of claim 1, wherein the base station is configured to perform packet loss concealment.

19. The endpoint system of claim 1, wherein the feature subset of the resource-limited device includes graphical display capability, and wherein the base station is configured to transmit at least one of dialing information, text information, graphics, video, or web content to the resource-limited device.

20. A communications system, comprising:
    the endpoint system of claim 1;
    the communications channel; and
    the endpoint device, wherein the endpoint device is configured to communicate with the endpoint system via the communications channel.

21. The endpoint system of claim 20, wherein the communications channel comprises at least one of a local area network, a wide area network, and an Internet connection.

22. The endpoint system of claim 20, wherein the endpoint device is configured to support Voice over Internet Protocol calls.

23. The endpoint system of claim 20, wherein the endpoint device comprises at least one of a telephone, a computer, and a public switched telephone network (PSTN) gateway.

24. The endpoint system of claim 20, wherein the endpoint system is configured to establish a Voice over Internet Protocol call with the endpoint device.

25. A method for media communication, the method comprising:
    communicating media and control information with a resource-limited device via a permanent virtual circuit, wherein the permanent virtual circuit includes one of a predetermined user datagram protocol (UDP) port or a negotiated UDP port;
    negotiating capabilities with the resource-limited device to determine a feature subset of the resource-limited device;
    transmitting media packets, to the resource-limited device, selected based on the feature subset of the resource-limited device;
    interfacing the resource-limited device with a surrounding environment, where the interfacing includes at least one of capturing and outputting at least one of audio information and graphic information by the resource-limited device;
    establishing a switched virtual circuit with an endpoint device via a communications channel;

translating media packets between the permanent virtual circuit and the switched virtual circuit;

converting media packets from the communications channel into a first digital audio compression format and converting media packets from the resource-limited device into a second digital audio compression format; and operating the resource-limited device in a standby mode, the resource-limited device powering components necessary to monitor for a resume signal.

26. The method of claim 25, wherein the communicating includes using a predetermined packet format.

27. The method of claim 26, wherein the communicating includes marking packets with a control payload type of the packets to indicate when the packets contain control information.

28. The method of claim 25, wherein the establishing includes using Session Initiation Protocol.

29. The method of claim 25, wherein the establishing includes using Media Gateway Control Protocol.

30. The method of claim 25, wherein the establishing includes using International Telecommunication Union Telecommunication Standardization Sector (ITU-T) Recommendation H.323.

31. The method of claim 25, wherein the second digital audio compression format is International Telecommunication Union Telecommunication Standardization Sector (ITU-T) Recommendation G.729.

32. The method of claim 25, wherein the first digital audio compression format is pulse-code modulation.

33. The method of claim 25, wherein the first digital audio compression format is International Telecommunication Union Telecommunication Standardization Sector (ITU-T) Recommendation G.711.

34. The method of claim 25, further comprising performing de-jitter buffer management.

35. The method of claim 25, further comprising performing packet loss concealment.

36. The method of claim 25, wherein the feature subset of the resource-limited device includes graphical display capability, the method further comprising transmitting at least one of dialing information, text information, graphics, video, or web content to the resource-limited device.

* * * * *